Oct. 17, 1967  M. B. CLARK ET AL  3,347,668
METHOD OF MAKING FUEL CELL ELECTRODES
Original Filed Jan. 11, 1963

INVENTORS
MILTON B. CLARK
WILLIAM G. DARLAND, JR.
BY
ATTORNEY

United States Patent Office 3,347,668
Patented Oct. 17, 1967

3,347,668
METHOD OF MAKING FUEL CELL ELECTRODES
Milton B. Clark, North Royalton, and William G. Darland, Jr., Parma, Ohio, assignors to Union Carbide Corporation, a corporation of New York
Original application Jan. 11, 1963, Ser. No. 250,939. Divided and this application May 25, 1966, Ser. No. 569,776
9 Claims. (Cl. 75—201)

ABSTRACT OF THE DISCLOSURE

A method of making fuel cell electrodes comprising the steps of mixing together a finely divided activated carbon and a substantially inert metallic powder, milling and blending said resultant mixture, compacting said mixture into a plaque, and sintering said compacted plaque in a hydrogen containing atmosphere.

---

Figure 1:
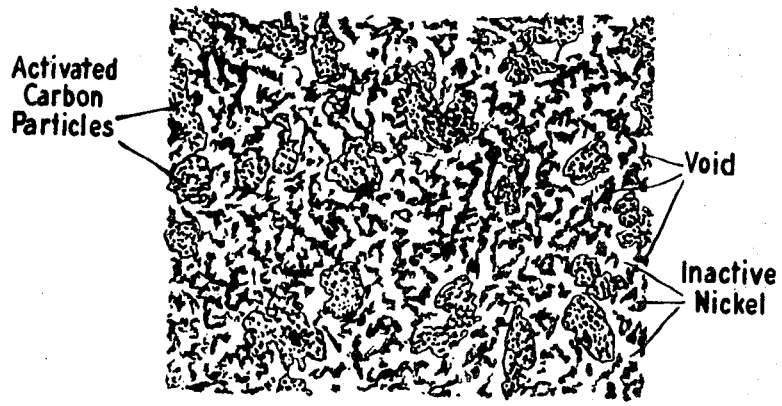

This application is a division of copending application Serial No. 250,939 filed January 11, 1963, now U.S. Patent 3,321,286.

This invention relates to fuel cell electrodes, and refers more particularly to improved metal-and-carbon fuel cell electrodes and to the method of producing such electrodes.

It has been endeavored in the art to develop fuel cells having metal-and-carbon electrodes and which could produce currents equal to that of present day fuel cells containing carbon electrodes but having considerably less cell volume than heretofore. Although carbon electrodes of present day fuel cells operate at relatively high current densities, they are invariably thick in size, weak and are not flexible. Thus, these obstacles must be overcome in order to design small high powered and lightweight fuel cell electrodes. On the other hand, metallic electrodes do not operate at such high current densities; however, they are exceedingly thin in size, exhibit greater strength and flexibility and therefore have desirable characteristics.

Accordingly, it is the principal object of the invention to provide improved metal-and-carbon electrodes which are capable of operating at high current densities normally attained by the use of conventional activated carbon electrodes and which are as strong as metallic electrodes.

Another object is to provide more rugged electrodes which are lightweight, exceedingly thin and which exhibit good flexibility.

Yet another object is to provide a method for the production of such electrodes.

These and other objects of the invention are achieved by an electrode which comprises a discontinuous phase of activated carbon embedded in a sintered metal matrix. The electrode is fabricated by mixing finely divided, substantially inert metal powder and activated carbon powders together, and then sifting the mixture to a very fine particle size. Thereafter the resultant mixture is dispensed into a mold and compacted under pressure to form a thin plaque which is subsequently sintered to form a metal to metal bond in a hydrogen or ammonia atmosphere.

Figure 2:
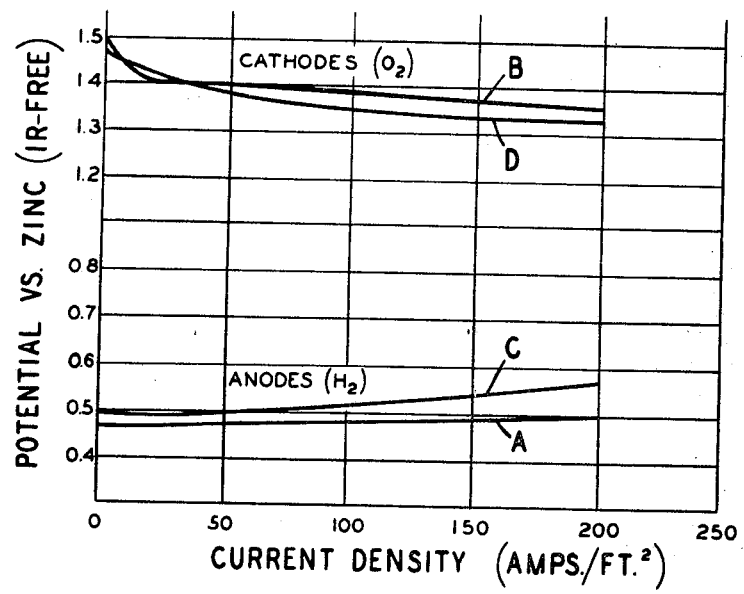

The invention will be described in greater detail with reference to the drawing forming a part of the disclosure of the invention, in which:

FIGURE 1 is a partial cross-sectional view of an electrode of the invention shown after the sintering operation; and FIGURE 2 is a set of curves comparing the current densities of the instant electrodes to standard activated carbon electrodes when operated as anodes, using hydrogen as the fuel gas and as cathodes using oxygen.

In FIGURE 1, there is shown a partial cross-sectional view of a single-layered electrode of the invention magnified 195X. As illustrated in the drawing, the large dark outlined black spotted particles are the activated carbon particles. The white areas consist of a multiplicity of very small particles of nickel and the small black spaces between both of these particles are voids.

More specifically, the electrodes of the invention are prepared by mixing, milling and blending together a carbon-metal powdered mixture. Suitably, a nickel or iron powder is used, other conductive but substantially inert metallic powders can also be used although they of course require sintering at other temperatures. Iron is best employed in the cathode as some corrosion problems are encountered when it is used in anodes. Other conductive materials include cobalt, titanium and silver. The particle size of the metallic powder utilized in the electrode of the invention should be within the range of between 0.1 and 40 microns. A more preferred range is between 2 and 9 microns. A preferred metallic powder is finely divided nickel powder which has been made from nickel carbonyl.

The activated carbonaceous materials found to be suitable are carbon particles prepared by activation with limestone or a projector grade lampblack carbon. These carbonaceous materials when activated exhibit large surface area and are preferably used in the practice of the invention. Graphite has not been found suitable since it cannot be readily activated. Also, acetylene black has been found unsuitable because it is too fluffy and will not compact well.

If it is desired to provide the electrodes with additional strength, a sintered metallic plaque can be used to support the carbon-metal powder mixture, and carbon in an amount ranging up to about 50 percent by weight of the mixture may thus be used in such construction. When metallic plaques are not embodied in the electrodes of the invention, the proportion of carbon in the mixture should not exceed about 15 percent. A more preferred range is between 5 and 10 percent. It should be noted that 10 to 15 percent by weight of carbon is approximately equal to 50 percent by volume when compared to fine nickel or iron powder.

Suitably, a wax-like binder may be used prior to molding the electrode. The use of the binder aids in obtaining green strength of the electrode before sintering it. If a binder is used, it may be dissolved in a suitable solvent such as toluene. Suitable binders are soft waxy solid polyethylene glycols and the like; other wax-like substances may also be used. If desired, a liquid binder or a powdered solid binder may be used instead of a solution. It is also particularly desirable if the binder has a low melting point and leaves little or no residue after sintering. This binder-solvent solution or liquid binder is combined with the carbon-metal mixture, thoroughly mixed, and the mixture thereafter allowed to dry. If a solid powdered binder is used, no drying step is needed. Subsequenlty, the mixture is crushed such that it will pass through a 200-mesh screen.

Prior to sintering, the mixture is deposited into a mold and compacted under pressure into a plaque of a desired thickness. The molding pressures exerted in making the plaques have a range from about between 2 tons per square inch to 6 tons per square inch. A preferred range is 2½ to 3½ tons per square inch. After the plaques are removed from the mold, they are placed in an oven containing a hydrogen or an ammonia atmosphere and sintered for a period of time at approximately 850° centigrade. It should be noted, that the range of temperature which may be used will vary depending upon the metal used in the electrode which is to be sintered. For example, the sintering temperature will range from 700° C. to 1000° C. for both a nickel or iron-carbon electrode. The preferred sintering temperature for both of these type electrodes is about 850° C. After sintering, the electrodes are cooled in the hydrogen or ammonia atmosphere of the oven and thereafter removed to the surrounding atmosphere. The sintering operation causes the inactive metallic particles to form a metal to metal bond, and it is this structural bond which gives the electrode of the invention its requisite conductivity, strength and durability, the activated carbonaceous particles being distributed among and throughout the metal to metal bond in a discontinuous phase. It should be noted that the inactive and substantially inert metallic particles are primarily used to form a structural bond which gives the electrode its strength and requisite support for the activated carbon particles.

Plaques having a thickness in the order of 1/32 of an inch have been fabricated. Very thin electrodes measuring less than 0.020 inch have also been prepared. All of these electrodes exhibit good flexibility, are porous and light in weight. They should be contrasted with standard carbon electrodes which are heavier and not as flexible since their thicknesses are about 1/4 inch or greater.

After sintering the electrodes may be wetproofed. One such wetproofing method is disclosed in U.S. Pat. 3,242,011. The electrodes may also be catalyzed by various methods, for example, a catalyst can be deposited on the surface of the electrode after sintering or if desired the electrode particles can be catalyzed prior to sintering.

Another embodiment of the invention is an electrode slightly modified in construction from that just described. These electrodes, for example, can be prepared by dispensing into a mold approximately a 0.010 inch layer of fifty percent by weight carbon and nickel powder and then depositing on the top thereof, a 0.020 inch layer of nickel powder. These two layers are then compacted at a pressure of about 3 tons per square inch prior to sintering. The procedure for sintering these electrodes is carried out in the same manner as hereinbefore described. The pore size of the electrodes range from 4.5 to 6.1 microns. An air permeability test on a 0.01 inch thick dry sample under 40 mm. of mercury pressure indicated that about 472 to 755 ml. per minute per square inch is passed through the sample.

The set of curves shown in FIGURE 2 of the drawing, illustrate the range of current densities at which the electrodes as described above have been operated. These curves were plotted from results obtained from test cells in which the electrodes of the invention were used. The electrolyte utilized in the test cells was a 12 molar potassium hydroxide solution. The cells were operated at a temperature of approximately 80° C. Voltages at various current densities were recorded versus a zinc reference electrode. Curves A and B represent the standard carbon electrodes and curves C and D represent the double-layered carbon-nickel sintered plaque electrodes. The curves show that at a voltage of 0.54 volt when using hydrogen as the fuel gas, the electrodes have operated as anodes at current densities as high as 200 amperes per square foot. When the electrodes were employed as cathodes using oxygen, current densities of about 200 amperes per square foot at 1.35 volts have been attained. These electrodes have operated at high current densities for many hours and have a lifetime of about 100 hours when operated as anodes (25 amperes per square foot) and over 1000 hours as cathodes at the same current density.

Other electrodes (cathodes) of the invention operated successfully at current densities of 25 amperes per square foot for 1362 hours. These cathodes were not wetproofed or catalyzed. Using current densities of 50 amperes per square foot, the cathodes performed successfully for 600 and 900 hours.

Other examples of electrodes of the invention which have performed satisfactorily are as follows:

A cathode made of 10 percent carbon and 90 percent cobalt operated at a current density of 25 amperes per square foot for over 200 hours. The voltage vs. zinc was 1.33 to 1.35 volts. Another cathode made of 5 percent carbon and 95 percent silver powder (through 325 mesh) has operated at 25 amperes per square foot for over 350 hours at a potential of 1.33 to 1.37 volts vs. zinc.

It is therefore apparent that high current densities can be achieved by the improved metal-and-carbon electrodes of the invention. Thus, the metallic powders when sintered provide the thermal and electrical conductivity, structural strength and durability for the electrodes and the carbonaceous powders impart the desired porosity and activity to the electrodes.

What is claimed is:

1. A method of making fuel cell electrodes comprising the steps of mixing together a finely divided activated carbon and a substantially inert metallic powder selected from the groups consisting of nickel, iron, cobalt, titanium and silver, milling and blending said resultant mixture, compacting said mixture into a plaque at a pressure of from about 2 tons per square inch to about 6 tons per square inch, sintering said compacted plaque in a hydrogen containing atmosphere and allowing said plaque to be cooled in said atmosphere.

2. The method of claim 1 wherein said sintering is done at a temperature from about 700° C. to 1000° C.

3. The method of claim 2 wherein said activated carbon is a projector grade lampblack carbon.

4. The method of claim 3 wherein said carbon powders are present in an amount by weight of the mixture of from about 5% to 50%.

5. The method of claim 4 wherein said metallic particles are between 0.1 and 40 microns in size.

6. The method of claim 5 wherein said mixture is supported on and adhered to a sintered metallic plaque.

7. The method of claim 1 wherein a binder is added to said powdered mixture and then sieved through a 200-mesh screen prior to molding.

8. The method of claim 7 wherein said binder is a solution of polyethylene glycol in toluene.

9. A method of making fuel cell electrodes comprising the steps of mixing together a finely divided activated carbon and a finely divided substantially inert metallic powder selected from the group consisting of nickel, iron, cobalt, titanium and silver, milling and blending said resultant mixture, depositing on said mixture a layer of substantially inert and conductive powders selected from the group consisting of nickel, iron, cobalt, titanium and silver, compacting said mixture and said layer into a plaque at a pressure of from about 2 tons per square inch to 6 tons per square inch, sintering said compacted plaque in a hydrogen containing atmosphere and allowing said plaque to be cooled in said atmosphere.

References Cited

UNITED STATES PATENTS

| | | | |
|---|---|---|---|
| 2,332,737 | 10/1943 | Marvin et al. | 75—208 |
| 2,418,812 | 4/1947 | Girvin | 75—201 |
| 2,672,495 | 3/1954 | Fleischer | 29—182.5 |
| 2,833,847 | 5/1958 | Salauze | 75—208 |
| 3,053,925 | 9/1962 | Donohue | 75—222 |
| 3,207,600 | 9/1965 | Hirai et al. | 75—201 |
| 3,244,515 | 4/1966 | Grune et al. | 75—208 |

FOREIGN PATENTS 83,060  7/1957  Denmark.

CARL D. QUARFORTH, *Primary Examiner.*

L. DEWAYNE RUTLEDGE, *Examiner.*

R. L. GRUDZIECKI, *Assistant Examiner.*